June 10, 1947.　　　A. KALITINSKY　　　2,421,839
GAS VALVE
Filed Jan. 28, 1944　　　3 Sheets-Sheet 1

INVENTOR
Andrew Kalitinsky
Charles A Warren
ATTORNEY

June 10, 1947.　　　A. KALITINSKY　　　2,421,839
GAS VALVE
Filed Jan. 28, 1944　　　3 Sheets-Sheet 2

INVENTOR
Andrew Kalitinsky
Charles A. Warren
ATTORNEY

June 10, 1947.                A. KALITINSKY                2,421,839
                                GAS VALVE
                          Filed Jan. 28, 1944           3 Sheets-Sheet 3
FIG. 4
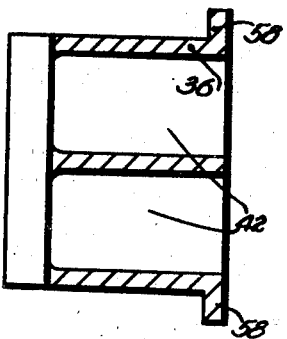
FIG. 5
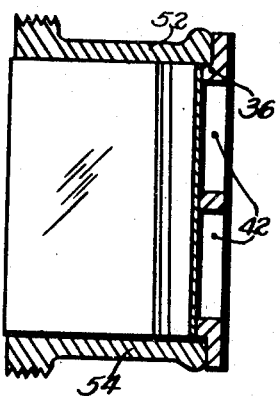
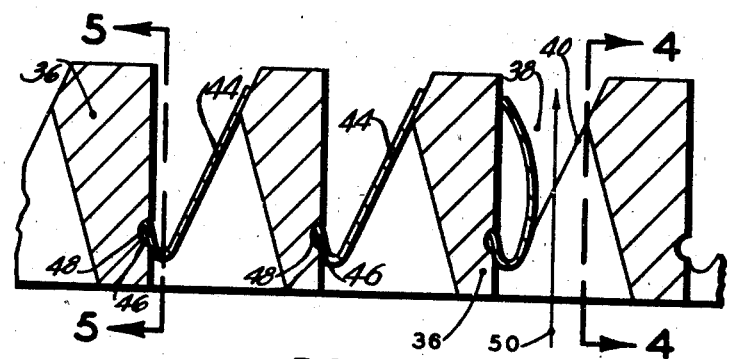
FIG. 3
INVENTOR
Andrew Kalitinsky
Charles Allison
ATTORNEY Patented June 10, 1947

2,421,839

UNITED STATES PATENT OFFICE 2,421,839

GAS VALVE

Andrew Kalitinsky, Eagleville, Conn., assignor to United Aircraft Corporation, East Hartford, Conn., a corporation of Delaware Application January 28, 1944, Serial No. 520,058

4 Claims. (Cl. 277—60)

When a compressor delivers a large quantity of gas, many intake and discharge valves are usually necessary, and ease of assembly is an important consideration. An object of this invention is the provision of a valve assembly in which the movable valve plates may be easily mounted in closely spaced relationship.

In valves of this character, where space is limited, it is advantageous to use as little of the space as possible for the movable valve plate and its support so that the areas of the gas passages may be as large as possible. To accomplish this, a single element constitutes not only the seat for one valve plate but also the support for the adjoining plate.

A feature of the invention is a valve structure of this type adapted to be incorporated in the head of the compressor. Other objects and advantages will be apparent from the specification and claims, and from the accompanying drawing which illustrates an embodiment of the invention.

Fig. 3 is a developed sectional view of the valve on the line 3—3 of Fig. 1.

Fig. 4 is a sectional view on 4—4 of Fig. 3.

Fig. 5 is a sectional view on line 5—5 of Fig. 3.

Figure 1:
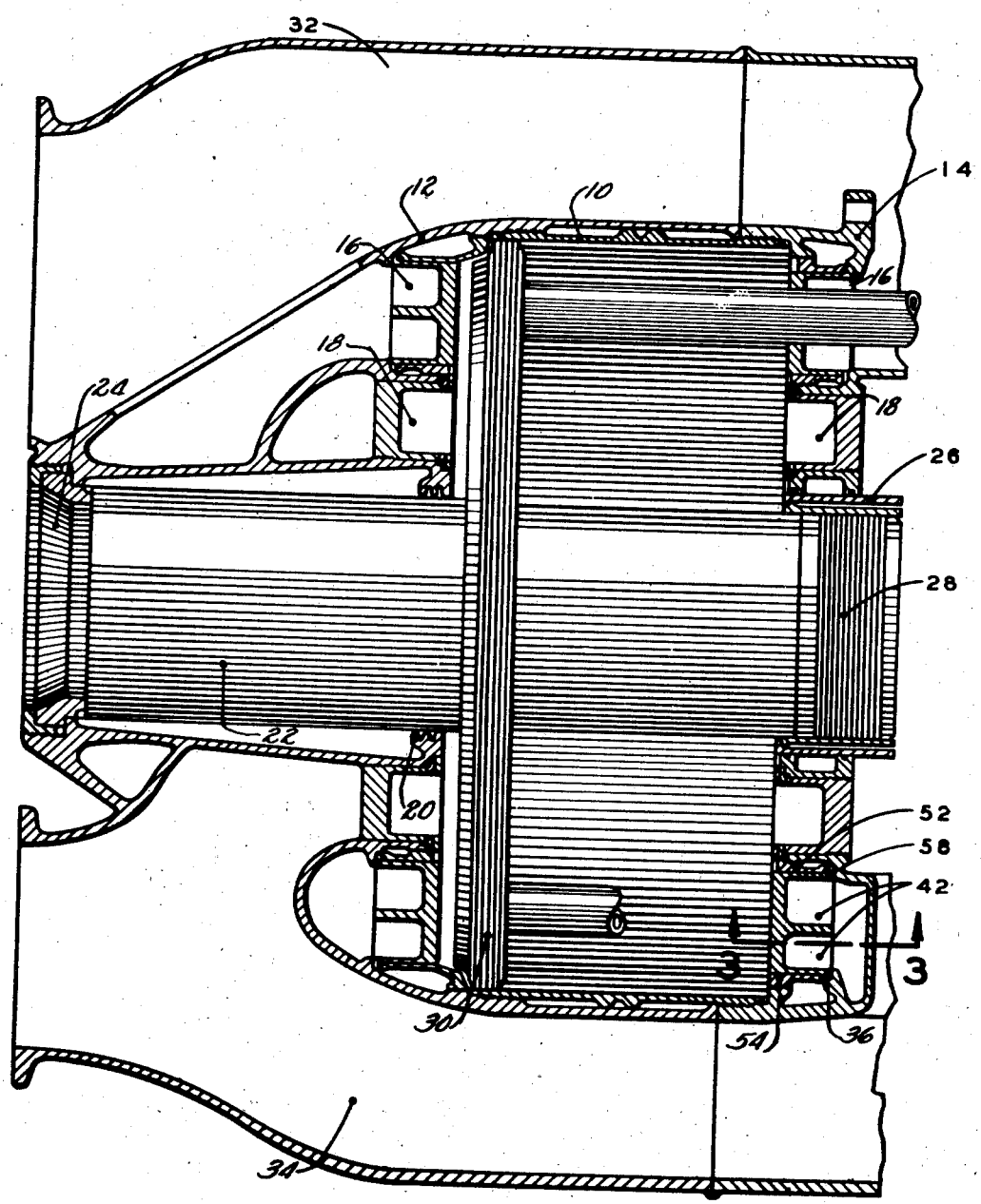
Fig. 1 is a sectional view through the compressor cylinder of a free-piston unit showing the valve structure.
Figure 2:
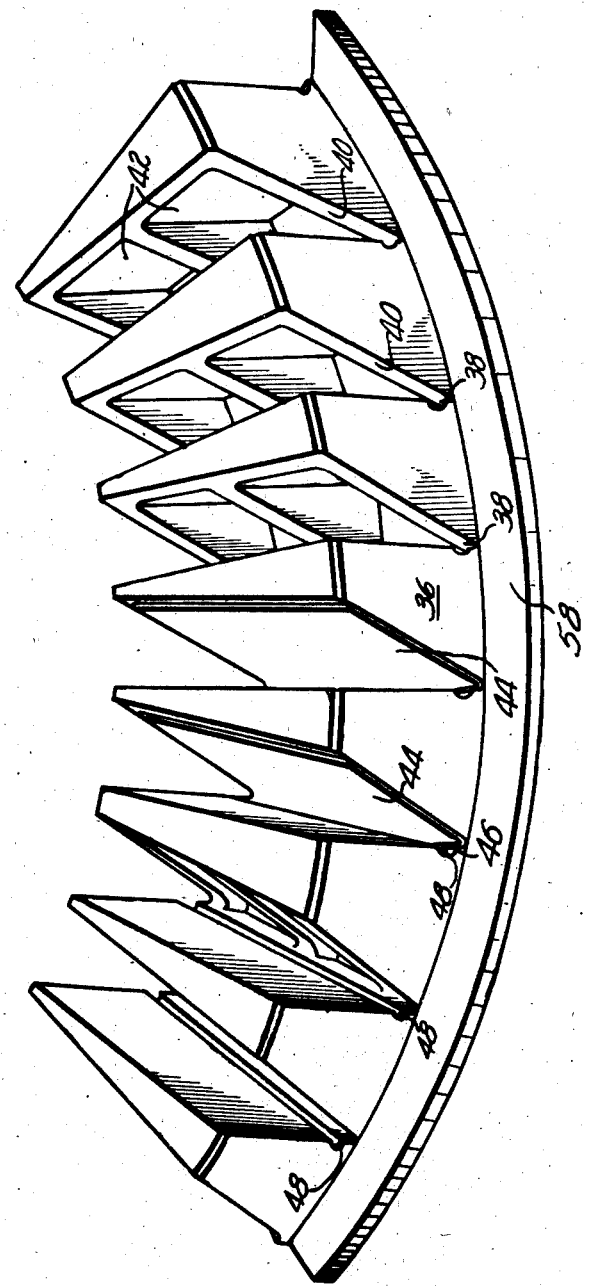
Fig. 2 is a perspective view of a part of the valve structure.

The valve structure is shown in the compressor heads of a free-piston engine-and-compressor unit which may be the type shown in the copending Kalitinsky application, Serial No. 486,611, filed May 11, 1943, now Patent No. 2,410,448, dated November 5, 1946. The compressor cylinder 10 has outer and inner cylinder heads 12 and 14 in each of which, sets of both intake valves 16 and discharge valves 18 are mounted. Head 12 may have a central opening 20 for the sleeve 22 which, in conjunction with a piston 24 fitting within the sleeve, forms an air spring for moving the piston assembly to the right. Head 14 has a central opening which receives the engine cylinder 26 in which the engine piston 28 is slidable. This piston is attached to the compressor piston 30 to which sleeve 22 is connected to form the piston assembly.

The sets of valves 16 and 18 are arranged in rings around the central openings in heads 12 and 14. The discharge valves are preferably between the intake valves and the central opening. The sets of valves may be similar in construction and one set of intake valves 16 will be described in detail. The intake valves are mounted to permit gas flow into the cylinder from intake manifold 32 and the discharge valves permit gas to flow out of the cylinder into manifold 34.

The set of intake valves shown in detail in Figs. 2–5 includes a circular base 36 having a number of radial grooves 38, one side surface of grooves forming a valve seat 40 extending at an acute angle to the axis of the base. The base also has gas passages 42 extending through the base, and intersecting the groove 38 so that seat 40 surrounds the passages. An elastic valve plate 44 in the slot engages seat 40 to close the passages. This valve plate has a projecting flange 46 at its leading edge which engages a recess 48 in base 36 so that the valve plates may be readily mounted individually within the base. Valve plate 44 is rebent as shown to form the flange 46 which by its resilience springs into recess 48 when the valve is pushed inwardly to fit within the slot. Recess 48 is preferably spaced from the base of the slot and is located as will be apparent in the side surface of the slot.

Valve seat 40 formed by the surface of each transverse slot extends at an acute angle to the direction of gas flow through the base. The gas flow is in the direction indicated by the arrow 50 so that the valve which also extends at an acute angle is readily opened by pressure on the valve plate.

The parts of the base between adjoining slots form spaced bars each of which supports one of the valve plates and constitutes the seat for the adjoining valve plate. By this arrangement of the slots and by the arrangement for mounting the valve plates, the slots may be closely spaced so that the total area of the gas passages may be a large part of the total of the base.

The open ends of the transverse slots may be closed by rings 52 and 54 engaging opposite side surfaces of the base and as shown in Fig. 1 being threaded to provide for mounting the valve base within the compressor head. The rings engaged projecting flanges 58 on the valve base to hold the base in place.

It is to be understood that the invention is not limited to the specific embodiment herein illustrated and described, but may be used in other ways without departure from its spirit as defined by the following claims.

I claim:

1. A gas valve comprising a base having several spaced similar bars integral therewith and defining gas passages, and several substantially flat elastic valve plates closing these gas passages, each bar supporting one plate and forming the valve seat for the adjoining valve, each supporting bar having a notch and the valve having a flange of which extends back upon the valve and is engageable with the notch for rigidly holding the valve in position, said plate engaging said base adjacent to the flange for holding said flange releasably within the notch.

2. In a gas valve, a base having a slot therein, one surface of said slot defining a single valve seat, said base having a gas passage communicating with said seat, and a single substantially flat flexible valve plate for the valve seat, said base having a notch adjacent to one edge of the passage, and said plate having a turned over edge forming a flange with its edge engaging the notch and holding the plate rigidly in position, said plate engaging the bottom of the slot adjacent to the flange for holding said flange releasably within the notch.

3. In a gas valve, a base having a number of slots therein, one wall of each slot defining a single valve seat, said base having a gas passage for each of said seats, and a single substantially flat flexible valve plate for each valve seat, said base having a notch in the side of each slot opposite to the adjacent valve seat and substantially parallel to the bottom of the slot, and each plate having a folded over edge forming a flange engaging with the notch in its respective slot for holding the plate in position, said folded over edge of the plate also engaging the bottom of the slot adjacent to the flange for holding said flange releasably within the notch.

4. In a gas valve, a base having a number of slots therein, one wall of each slot defining a single valve seat, said base having a gas passage for each of said seats, and a single substantially flat flexible valve plate for each valve seat, said base having a notch in the side of each slot opposite to the adjacent valve seat and substantially parallel to the bottom of the slot, and each plate having a folded over edge forming a flange engaging with the notch in its respective slot for holding the plate in position, said folded over edge of the plate also engaging the bottom of the slot adjacent to the flange for holding said flange releasably within the notch, the ends of the slots in said base being closed by plates engaging the side surfaces of the base.

ANDREW KALITINSKY.

REFERENCES CITED

The following references are of record in the file of this patent:

UNITED STATES PATENTS

| Number | Name | Date |
|---|---|---|
| 355,033 | Schuetz | Dec. 28, 1886 |
| 623,478 | Keene | Apr. 18, 1899 |
| 2,199,307 | Eichelberg | Apr. 30, 1940 |
| 1,022,157 | Scott | Apr. 2, 1912 |
| 2,012,454 | McDermet | Aug. 27, 1935 |
| 1,682,907 | Holdsworth | Sept. 4, 1928 |
| 1,627,680 | Vollmann | May 10, 1927 |
| 1,780,524 | Huff | Nov. 4, 1930 |

FOREIGN PATENTS

| Number | Country | Date |
|---|---|---|
| 496,795 | Great Britain | Dec. 6, 1938 |